US006856326B1

(12) United States Patent
Zhai

(10) Patent No.: US 6,856,326 B1
(45) Date of Patent: *Feb. 15, 2005

(54) SMOOTH SCROLLING SYSTEM AND METHOD

(75) Inventor: Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,473

(22) Filed: Jan. 28, 2000

(51) Int. Cl.[7] .................................................. G09G 5/34
(52) U.S. Cl. ....................................... 345/684; 345/685
(58) Field of Search ................................. 345/684, 687, 345/688, 689, 830, 833, 685, 686, 784, 785, 786, 787, 788, 789, 802, 973; 382/120, 121, 122, 123, 312–324; D14/487

(56) References Cited

U.S. PATENT DOCUMENTS

| | | | |
|---|---|---|---|
| 5,371,846 A | | 12/1994 | Bates |
| 5,392,388 A | | 2/1995 | Gibson |
| 5,532,715 A | | 7/1996 | Bates et al. |
| 5,550,969 A | * | 8/1996 | Torres et al. ............... 345/787 |
| 5,553,225 A | | 9/1996 | Perry |
| 5,668,961 A | * | 9/1997 | Healy et al. ................ 345/744 |
| 5,825,352 A | * | 10/1998 | Bisset et al. ................ 345/173 |
| 5,850,531 A | | 12/1998 | Cox et al. |
| 5,872,566 A | * | 2/1999 | Bates et al. ................. 345/786 |
| 5,874,961 A | | 2/1999 | Bates et al. |
| 5,877,758 A | * | 3/1999 | Seybold ...................... 345/866 |
| 5,877,766 A | | 3/1999 | Bates et al. |
| 5,889,236 A | * | 3/1999 | Gillespie et al. ......... 178/18.01 |
| 6,020,887 A | * | 2/2000 | Loring et al. ............... 345/786 |
| 6,252,579 B1 | * | 6/2001 | Rosenberg et al. ......... 345/856 |
| 6,281,881 B1 | * | 8/2001 | Siddiqui et al. ............ 345/164 |
| 6,292,174 B1 | * | 9/2001 | Mallett et al. .............. 345/163 |
| 6,421,064 B1 | * | 7/2002 | Lemelson et al. .......... 345/688 |
| 6,590,594 B2 | * | 7/2003 | Bates et al. ................. 345/784 |

OTHER PUBLICATIONS

IBM Technical Disclosure Bulletin, "Real–Time Scrolling of Image/Fax on a Non–Programmable Terminal", Vol. 38, No. 1, Jan. 1995, pp. 467–468.

* cited by examiner

Primary Examiner—Michael Razavi
Assistant Examiner—Thu-Thao Hauan
(74) Attorney, Agent, or Firm—Jon A. Gibbons; Fleit, Kain, Gibbons, Gutman, Bongini & Bianco P.L.

(57) ABSTRACT

A system and method for smooth scrolling a document and/or window within a graphical user interface is disclosed. The present invention in some preferred embodiments permits augmentation of traditional LINE UP/DOWN, PAGE UP/DOWN, and manual THUMBTRACK scrolling with a smooth scrolling alternative that augments additional hardware input features that may be present on several user input devices such a mouse, trackball, touchpad, Thinkpoint™ pointing device and the like. The present invention generally solves the problem associated with providing the user the proper degree of scrolling feedback within the graphical user environment, irrespective of the size of the document being viewed.

21 Claims, 16 Drawing Sheets

*EXEMPLARY SCROLL BAR INPUT*

*PRIOR ART*

*PRESENT INVENTION
EXEMPLARY INPUT DEVICE*

PRESENT INVENTION
EXEMPLARY SCROLL SPEED/ACCELERATION CURVE & CONTROL

**Function Header
1300**

```
void SendSmartMsg(HWND hWnd,int dz,int dw)
{
    SCROLLINFO   ScrollInfoH, ScrollInfoV;

LRESULT      rtn;
    int          nAbsZ, nAbsW;
    int          nSignZ = 1, nSignW = 1;
    long         yInc = 0, xInc = 0;
    static HWND  hSBWnd = NULL;
    float        fYInc, fXInc;
    static float fYMod = 0.0, fXMod = 0.0;

if(hSBWnd != hWnd) {
        hSBWnd = hWnd;
        fYMod = fXMod = 0.0;
    } if(dz < 0) nSignZ = -1;
    if(dw < 0) nSignW = -1;
    nAbsZ = abs(dz);
    nAbsW = abs(dw);
```

*FIG. 14*

Constant Calculation
1400

```
if(_bFSRStick){
    int    nAbszCount, nAbswCount;
    RECT   rect;
    int    wWinHeight = 1000, wWinWidth = 1000;

nAbszCount = abs(dz);
    nAbswCount = abs(dw);
    if(nAbswCount < 0) nAbswCount = 0;
    if(nAbszCount > MAX_MICKEYS) nAbszCount = MAX_MICKEYS;
    if(nAbswCount > MAX_MICKEYS) nAbswCount = MAX_MICKEYS;
    nAbsZ = _AccTbl[nAbszCount].wLines;
    nAbsW = _AccTbl[nAbswCount].wLines;
    GetWindowRect(hWnd, &rect);
```

FIG. 15

Vertical Smooth Scrolling
1500

```
if (nAbsZ) {
    ScrollInfoV.cbSize = sizeof(SCROLLINFO);
    ScrollInfoV.fMask = SIF_ALL;
    GetScrollInfo(hWnd, SB_VERT, &ScrollInfoV);
    wWinHeight = (rect.bottom - rect.top) * 2;
    fYInc = (ScrollInfoV.nPage * nAbsZ / (float) wWinHeight);
    fYInc = (fYInc * nSignZ) / 20.0 + fYMod; // 20 is samples per seccond
    yInc = (int) fYInc;
    fYMod = fYInc - yInc;
    if (yInc) {
        ScrollInfoV.nPos += yInc;
        if (ScrollInfoV.nPos < ScrollInfoV.nMin)
            ScrollInfoV.nPos = ScrollInfoV.nMin;
        if (ScrollInfoV.nPos > (ScrollInfoV.nMax - ScrollInfoV.nPage + 1))
            ScrollInfoV.nPos = ScrollInfoV.nMax - ScrollInfoV.nPage + 1;

rtn = SendMessage(hWnd,WM_VSCROLL,
                MAKELONG(SB_THUMBTRACK, ScrollInfoV.nPos),
                (LPARAM) NULL);

SetScrollPos(hWnd,SB_VERT,ScrollInfoV.nPos,FALSE);
        SetScrollPos(hWnd,SB_HORZ,ScrollInfoH.nPos,FALSE);
    }
}
```

Horizontal Smooth Scrolling
1600

```
if (nAbsW) {
    ScrollInfoH.cbSize = sizeof(SCROLLINFO);
    ScrollInfoH.fMask = SIF_ALL;
    GetScrollInfo(hWnd, SB_HORZ, &ScrollInfoH);
    wWinWidth = (rect.right - rect.left) * 2;
    fXInc = (ScrollInfoH.nPage * nAbsW / (float) wWinWidth);
    fXInc = (fXInc * nSignW) / 20.0 + fXMod;
    xInc = (int) fXInc;
    fXMod = fXInc - xInc;
    if (xInc) {
        ScrollInfoH.nPos += xInc;
        if (ScrollInfoH.nPos < ScrollInfoH.nMin)
            ScrollInfoH.nPos = ScrollInfoH.nMin;
        if (ScrollInfoH.nPos > (ScrollInfoH.nMax - ScrollInfoH.nPage + 1))
            ScrollInfoH.nPos = ScrollInfoH.nMax - ScrollInfoH.nPage + 1;

rtn = SendMessage(hWnd,WM_HSCROLL,
                MAKELONG(SB_THUMBTRACK, ScrollInfoH.nPos),
                (LPARAM) NULL);

SetScrollPos (hWnd, SB_VERT, ScrollInfoV.nPos, FALSE);
        SetScrollPos (hWnd, SB_HORZ, ScrollInfoH.nPos, FALSE);
    }
}
FlushScrollMessage(WM_MSG_FSR,WM_MSG_LINEDOWN);
}
```

SMOOTH SCROLLING SYSTEM AND METHOD

TABLE OF CONTENTS

Provided for Examination Reference Purposes

UTILITY PATENT APPLICATION OF SPECIFICATION
TITLE OF INVENTION
PARTIAL WAIVER OF COPYRIGHT
CROSS REFERENCE TO RELATED APPLICATIONS
STATEMENT REGARDING FEDERALLY SPONSORED RESEARCH OR DEVELOPMENT
REFERENCE TO A MICROFICHE APPENDIX
FIELD OF THE INVENTION
BACKGROUND OF THE INVENTION
  Overview
  Pointing Device System Architecture
  Graphical Processing of API Messages
  Pointing Device/API Message Contextual Mapping
DESCRIPTION OF THE PRIOR ART
  User Input Devices
  Scrolling in the Prior Art
BRIEF SUMMARY OF THE INVENTION
  Overview
  Generalized System Architecture
  Exemplary Advantages
BRIEF DESCRIPTION OF THE DRAWINGS
DESCRIPTION OF THE PRESENTLY PREFERRED EXEMPLARY EMBODIMENTS
  Embodiments are Exemplary
  Definitions
    System Blocks/Procedural Steps Not Limitive
    Personal Computer Not Limitive
    Operating System Not Limitive
    Graphical Interface Model Not Limitive
    Pointing Device Not Limitive
    Translation Means Not Limitive
  System
    Overview
    Pointing Device Message Filter (0801)
    Transfer Function Generator (0802)
      Overview
      Exemplary Transfer Function (0910)
      Scrolling Sensitivity Adjustment (0910)
    API Message Generator (0803)
    API Message Transmitter (0804)
    API Message Sink (0820)
    Method
      Exemplary Smooth Scrolling Method
      Generalized Methodology
    Computer Software
  CONCLUSION
CLAIMS
ABSTRACT OF THE DISCLOSURE All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

STATEMENT REGARDING FEDERALLY SPONSORED RESEARCH OR DEVELOPMENT

REFERENCE TO A MICROFICHE APPENDIX

Not Applicable

FIELD OF THE INVENTION

The invention is related in the general area of pointing devices and their associated graphical user interfaces. In many exemplary embodiments, the present invention permits the smooth scrolling of a document and/or window in response to user input from a pointing device such as a mouse, trackball, touchpad, Trackpoint™ pointing device or the like. As such, the present invention significantly improves the interaction between the user and the information being displayed by the graphical user interface.

BACKGROUND OF THE INVENTION

Overview

The invention is related in the general area of graphical user interfaces and the use of user input devices such as mice, trackballs, Touchpoint™ pointing devices and the like. The present invention is directly related to the interaction between the inputs from the pointing device and the graphical interface presented to the user.

Pointing Device System Architecture

As illustrated in FIG. 1, a typical pointing device system interface (0100) provides for a hardware input device such as a mouse (0101) that connects to a personal computer (PC) (0102) on which a computer hardware interface (0103) resides. This hardware interface (0103) is supported via a software device driver (0104) that is under control of an operating system (0105).

For systems incorporating a graphical user interface, typically an application programming interface (API) (0106) is layered on top of the operating system to direct information messages (0107) regarding pointing device (0101) movement to an application program (0108). These messages are subsequently "cracked" to decode their results by a message cracker (0109) that is typically incorporated within the application program (0108). Once cracked, these messages are then used to direct output to the graphical output device on the PC (0102) under control of the application program (0108).

Graphical Processing of API Messages

Referencing FIG. 2, a conventional graphical interface window (0200) in which a document (0201) or other information is displayed typically will include one or more scroll bars (0202) that may be used to generate a viewport into the document (0201). Control of the scroll bar (0202) is typically accomplished via manipulation of the scroll box (0207) that graphically illustrates the position of the viewport with respect to the document (0201). Within this context, the nPage variable (0209) represents the size of the viewport page with respect to the total document size.

Within the context of the prior art, the scrollbox (0207) position (and thus the corresponding document viewport) may be controlled using one of three mechanisms:
1. The pointing device may be used to select the LINE UP (0203) or LINE DOWN (0212) buttons, which send corresponding SB_LINEUP and SB_LINEDOWN API messages to the application program.
2. The pointing device may be used to select the PAGE UP (0205) or PAGE DOWN (0210) regions above and below the scroll box (0207), which send corresponding SB_PAGEUP and SB_PAGEDOWN API messages to the application program.
3. The pointing device may be placed over the scroll box (0207), a mouse button (0301, 0302, 0303, 0401, 0402, 0403) depressed, and the mouse used to move the scroll box (0207) up and down (0208) the scroll bar (0202). This action sends corresponding SB_THUMBPOSITION/ SB_THUMBTRACK API messages to the application program.

Note that in all three of the above cases the relationship between the viewport movement and the pointing device input is linear.

Pointing Device/API Message Contextual Mapping

As can be surmised from FIG. 1 and FIG. 2, there typically exists a direct mapping between the pointing device (0101) input and the API messages (0107) that are generated by the application programming interface (0106). The interaction between these API messages (0107) and the graphical user interface (0200) and more specifically the function of the document/window (0201) and corresponding scroll bar (0202) are the subject of the present invention.

While traditional pointing device (0101) encoder systems have provided only a linear method of positioning the scroll bar (0202) based on pointing device inputs, the present invention permits this movement to be controlled in a nonlinear manner that provides for a smoother and more ergonomic user interface.

It should be noted that the addition of more pointing device (0101) context information aids in this new smooth scrolling functionality. As illustrated in FIGS. 3–6, a wide variety of pointing devices are available for selection by the user, with a number of these (0400, 0500, 0600) incorporating more hardware data inputs than available on a conventional mouse pointing device (0300). The additional API messages (0107) available from the use of these additional hardware features can be used to generate a greater variety of API messages (each having new unique functionality) that actually reach the application program (0108). This capability is advantageously exploited by the present invention.

Description of the Prior Art

The prior art has been typically developed surrounding the system architecture of FIG. 1 as applied to a variety of pointing device user input devices.

User Input Devices

Referencing FIG. 3, the prior art has typically utilized mouse input devices (0300) or the like comprising one, two or three input buttons (0301, 0302, 0303) to provide a variety of informative messages that are context-sensitive based on the API state (0106) as well as the application program (0108) and message cracker (0109) illustrated in FIG. 1.

Scrolling a document and/or a window is one of the most frequent tasks in interacting with today's computers. A recent trend in the computer industry is to adopt an input device that offers a dedicated document/window scrolling device. For example, there have been attempts by some manufacturers to augment the functionality of mouse input buttons (0301, 0302, 0303) illustrated in FIG. 3 with additional scrolling functionality. One example of this is illustrated in FIG. 4, wherein the center button (0302) of FIG. 3 has been augmented with a scrolling thumbwheel (0402) function. In this context, the mouse (0400) illustrated in FIG. 4 has identical left (0401), center (0402), and right (0403) input buttons, but also has an additional wheel input feature (0402) that can provide additional messaging (0107) from the API (0106) to the application program (0107).

Other examples of the move to a dedicated scrolling input device include:
1. a scrolling wheel in the Microsoft® Intellimouse™ (similar to (0402) illustrated in FIG. 4);
2. scroll areas (0521, 0523) in the touchpads (0500) used in notebook computers as illustrated in FIG. 5;
3. a button, when pressed, that enables scrolling by the Trackpoint™ (0531) in the IBM Thinkpad™ notebook computers or the like as illustrated in FIG. 5; and/or
4. the ScrollPoint™ stick in the IBM ScrollPoint Mouse (similar to (0604) illustrated in FIG. 6);

All of these methods generally provide for a linear mapping of scrolling input to corresponding document/window (scrollbar) movement. For example, the scrolling wheel illustrated in (0402) will generally operate an encoder that sends pulses to the hardware interface (0103) and corresponding mouse driver (0104) such that a fixed rotation of the wheel (0402) results in a corresponding linear increment in the document/window (scrollbar).

Scrolling in the Prior Art

There are generally three current methods of transforming signals from the above-mentioned scrolling devices to document and/or Window movement.
1. The first transformation method is to use a combination of LINE (UP or DOWN) and PAGE (UP or DOWN) messages that correspond to an ARROW KEY (UP or DOWN) or PAGE (UP or DOWN) on a computer keyboard (0510) as illustrated in FIG. 5. Often within an API environment there is an overlap between keyboard messages and corresponding pointing device functions (termed keyboard accelerators) to permit an application program to operate without a pointing device. See Charles Petzold, PROGRAMMING WINDOWS 3.1 (third edition) pages 339–405 (ISBN 1-55615-395-3, 1992).
2. The second transformation method is to use a wheel message that corresponds to a notch of a scrolling wheel rotation in a Microsoft® Intellimouse™ pointing device or the like. A comparable implementation of the scrolling wheel (0402) by another vendor is illustrated in FIG. 4. The scrolling wheel input is generally obtained from a linear encoder on the scrolling wheel, thus providing a 1:1 mapping between scrolling functionality and scrolling wheel movement.
3. The third method is to send API messages that correspond to dragging the scrollbar of a document, resulting in a smooth movement of the document/window. This function is illustrated in FIG. 2 wherein the Mouse Scroll function (0208) is moved by the mouse or other pointing device. Within Microsoft® Windows™ environments, this typically conforms to processing of the SB_THUMBTRACK API message.

In the first two case just mentioned the scrolling does not appear to be very smooth due to the noticeable movement increment associated with the scrolling function. As a result, the scrolling results appears "jumpy" and unpleasant to user's eye.

There are two problems with the third, scrollbar manipulation approach. One is that some applications do not update the viewing area until the scrollbar is released. Within Microsoft® Windows™ environments, this state typically conforms to processing of the SB_THUMBPOSITION API message. These types of applications will not respond to such scrolling messages dynamically.

The second problem is that the scrollbar message sends a percentage of the document relative to its total size. For the same signal from the scrolling devices, this method produces an varying amount of absolute movement depending on the document size. For a large document, the resulting movement may appear to be too fast. For a small document, it may appear to be too slow.

The current invention solves the second problem by implementing two scrolling methods. The first uses the scrollbar message and the other uses the LINE+PAGE message. When an application that is known to dynamically respond to the scrollbar message the scrollbar message will be used. For the rest of the applications the LINE+PAGE message will be automatically switched on.

The current invention solves the problems associated with use of the scrollbar by normalizing the scrolling increment according the document size resulting in the same amount of movement from the same level of scrolling signal regardless the document size.

1. Accordingly, a need exists to overcome the deficiencies in the prior art and to provide: a system and method to permit smooth scrolling of documents and/or windows that corrects the jumpy nature of this functionality in the prior art; implement smooth scrolling at a more primitive level than the application program, thus eliminating the need for the application program to specifically implement a smooth scrolling feature; and permit the smooth and consistent scrolling effect independent of the size of the document or window being scrolled, using either all linear or non-linear scrolling mechanism, such as a wheel, a force sensitive stick or a touch sensitive surface.

BRIEF SUMMARY OF THE INVENTION

Overview

The invention is related in the general area of user input pointing device technology. The present invention extends the prior art by providing the user a mechanism of smooth scrolling that utilizes the additional input features of modern pointing devices while maintaining the conventional scrolling methods present in the prior art. Significantly, the features of the present invention can (in some embodiments) be implemented at a pointing device driver level, thus permitting application programs the functionality of smooth scrolling without the need for software modifications.

Generalized System Architecture

Referencing FIG. 7, the generalized system architecture of the present invention incorporates a translation module (0710) that in many preferred embodiments is implemented between the operating system (0705) and the application programming interface (API) (0706). This translation module (0710) intercepts scrolling input from the pointing device and translates this to corresponding API messages (0707) that are later processed by the application program (0708) via a message cracker (0709).

However, as illustrated in FIG. 7, the teachings of the present invention can equivalently be implemented within any functional block within the pointing device interface system architecture, including the pointing device itself (0701, 0711), the hardware interface (0703, 0713), the device driver (0704, 0714), the operating system (0705, 0715), the application programming interface (0706, 0716), the application program (0708, 0718), the message cracker (0709, 0719), or an optional independent message processing task (0720). Specifically, the use of an optional independent external message processing task (0720) permits interception of API (0706) messages (0721) that are processed and/or filtered (0720) and then directed (0722) to the application program (0708). This specific embodiment generally requires severing of the API messages (0707) directly to the application program (0708) when using this optional bypass message processing task combination (0720, 0721, 0722).

In all of these cases the function of the present invention is to transform scrolling input (however defined or implemented in the pointing device) into corresponding smooth scrolling commands that are interpreted at the application program level (0706).

Exemplary Advantages

Overall the present invention can in some exemplary embodiments provide one or more of the following advantages over the prior art:
1. The present invention permits smooth scrolling without modification of existing application program code.
2. The present invention does not interfere with existing scrolling methods, and is thus backward compatible with existing user expectations.
3. The present invention permits a non-linear relationship between scrolling and pointing device input to be achieved.
4. The present invention efficiently handles both large and small document sizes with consistent scrolling effect.

One skilled in the art will realize that these advantages may be present in some embodiments and not in others, as well as noting that other advantages may exist in the present invention that are not specifically listed above.

BRIEF DESCRIPTION OF THE DRAWINGS

For a fuller understanding of the advantages provided by the invention, reference should be made to the following detailed description together with the accompanying drawings wherein:

FIGS. 12–16 illustrate an exemplary smooth scrolling software interface implemented in C-code within the context of the Microsoft® Windows™ operating environment.

DESCRIPTION OF THE PRESENTLY PREFERRED EXEMPLARY EMBODIMENTS

Embodiments are Exemplary

Figure 1:
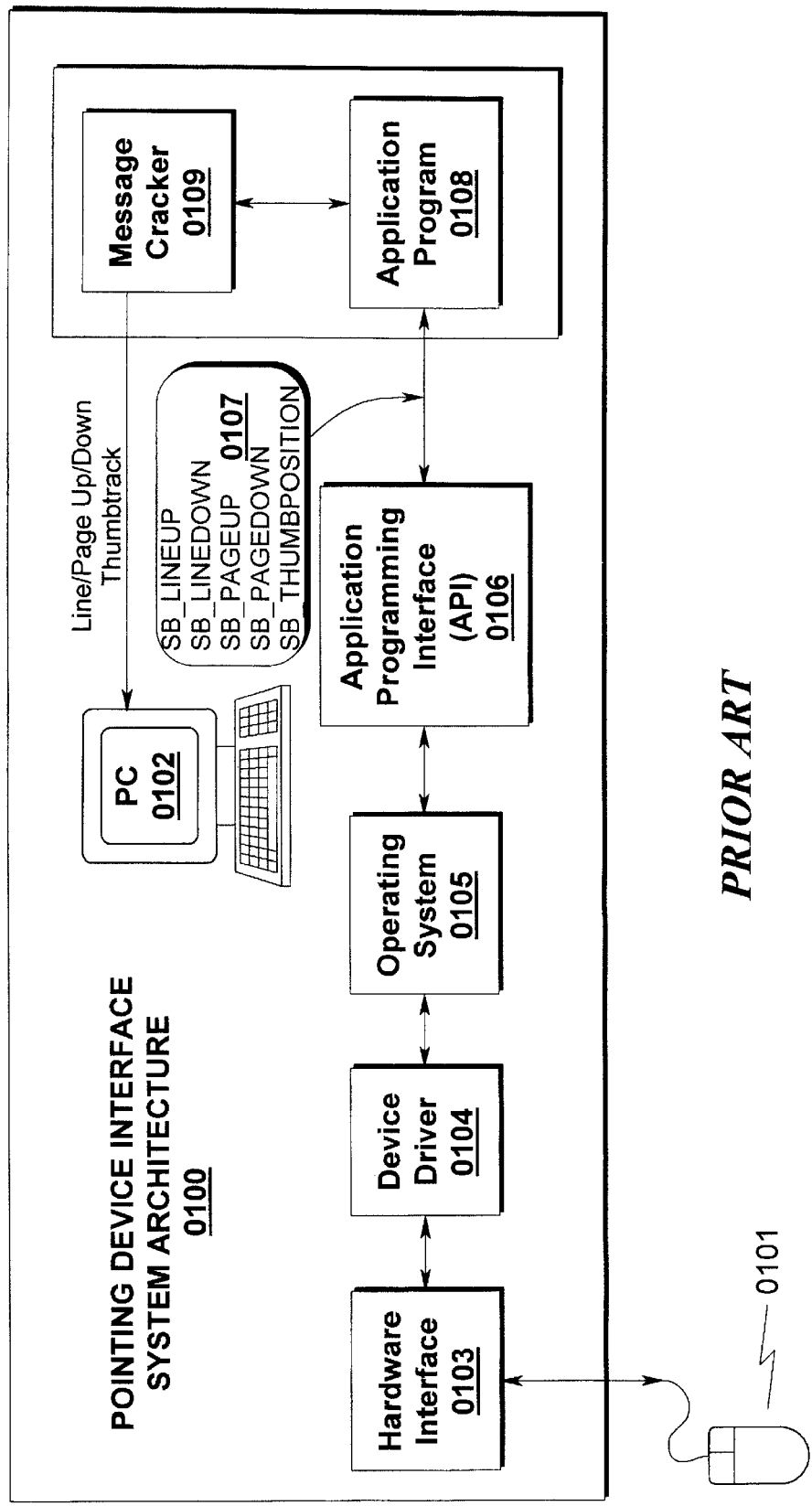
FIG. 1 illustrates a prior art system block diagram of a pointing device interface system architecture.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of an SMOOTH SCROLLING SYSTEM AND METHOD. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface.

Graphical Interface Model Not Limitive

Figure 2:
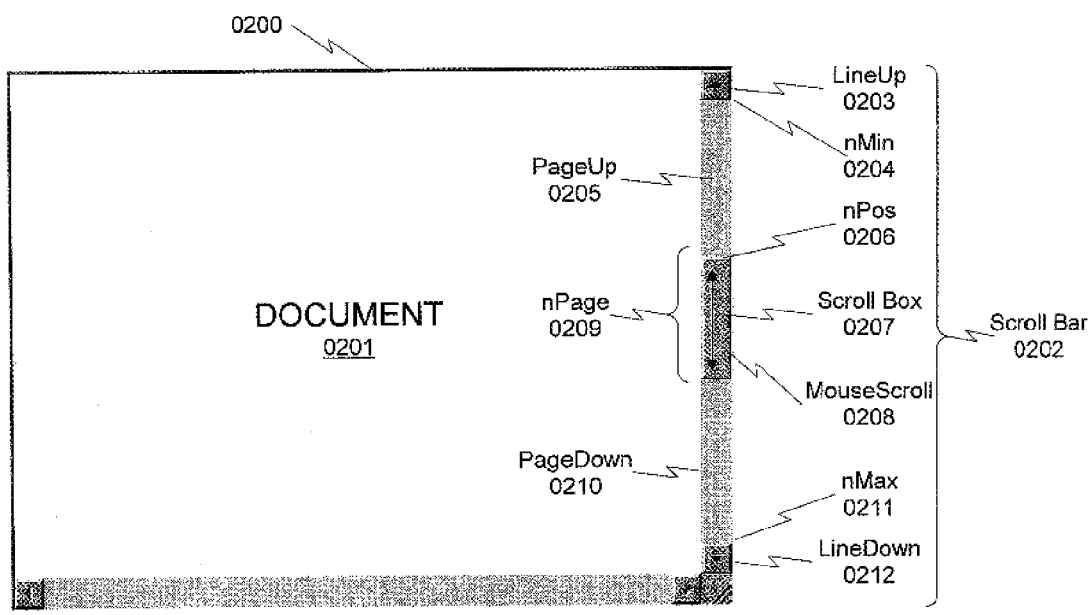
FIG. 2 illustrates a prior art exemplary scroll bar input interface.

Correspondingly, while the smooth scrolling input functionality may be advantageously applied to the graphical interface model illustrated in FIG. 2, nothing in the teachings of the present invention limits the scope of application to this particular interface model.

Pointing Device Not Limitive

Figure 3:
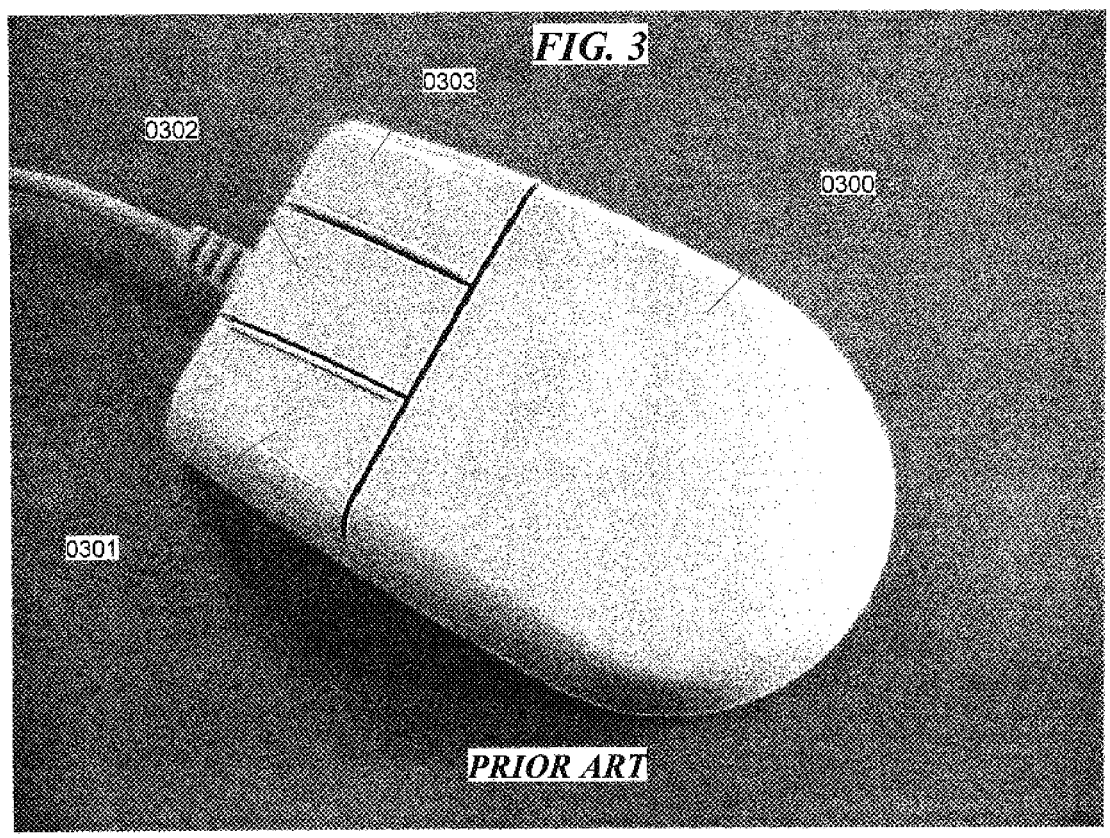
FIG. 3 illustrates a prior art conventional mouse interface.
Figure 4:
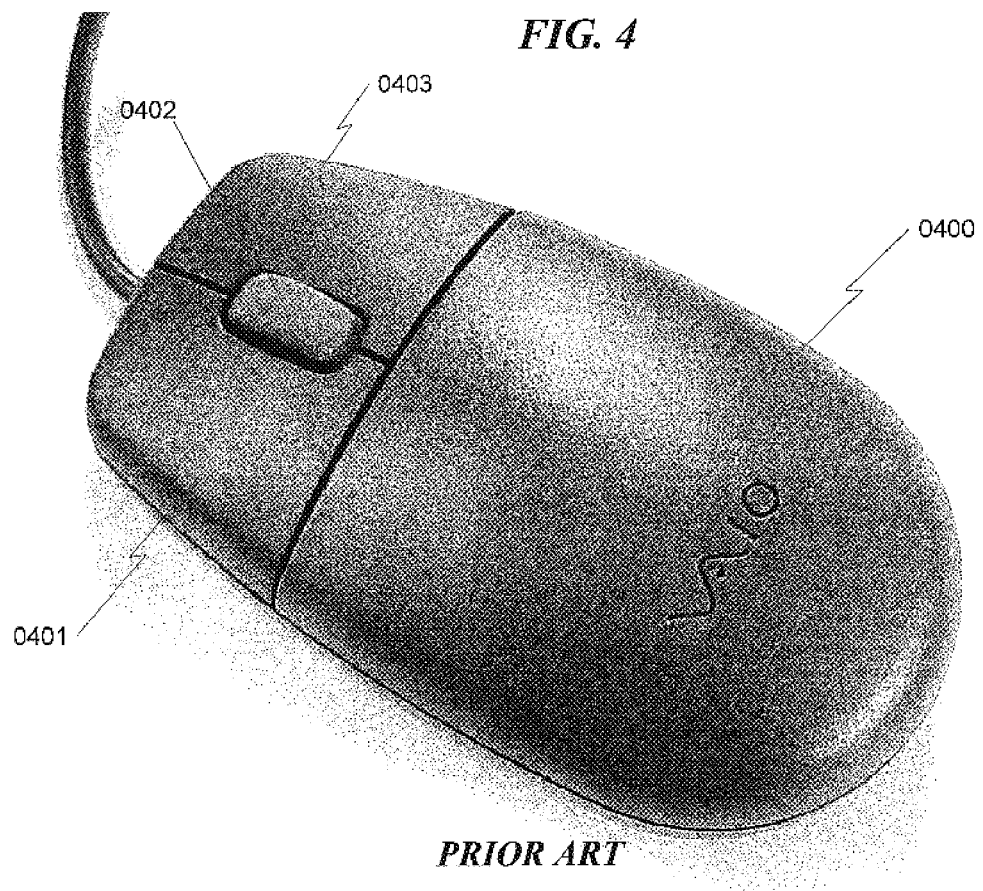
FIG. 4 illustrates a prior art mouse incorporating a scrolling wheel.
Figure 5:
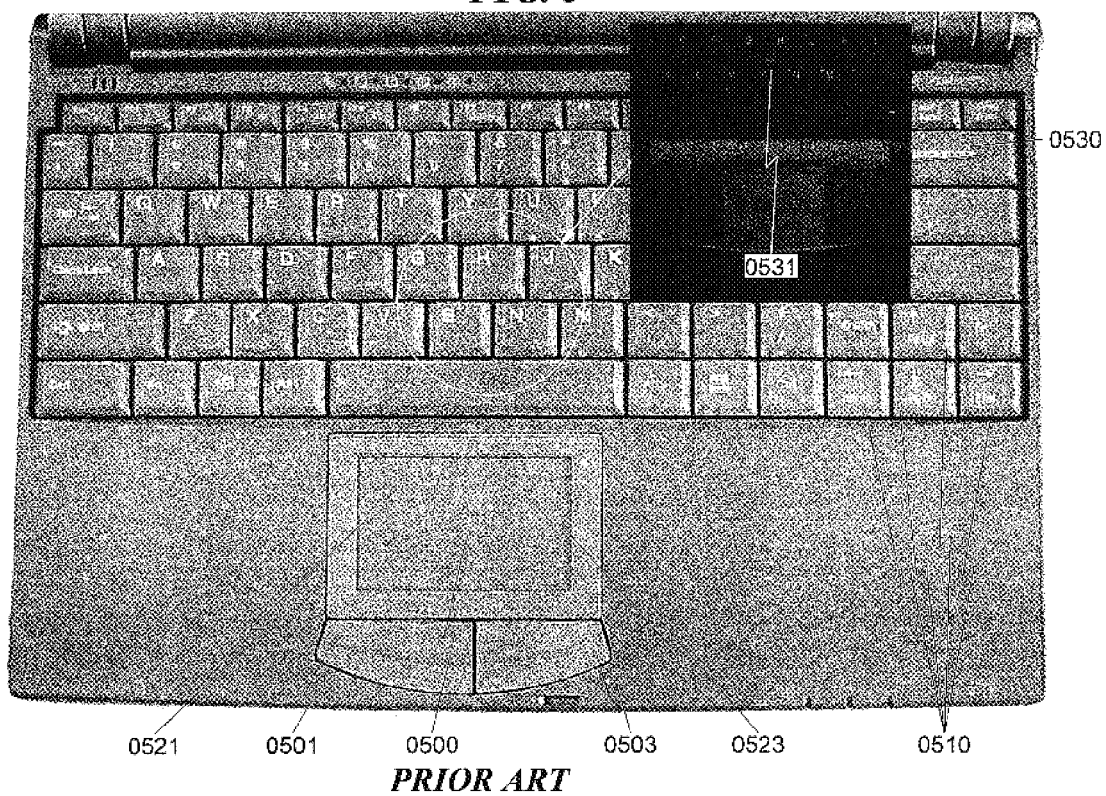
FIG. 5 illustrates a prior art touchpad and IBM-style Thinkpoint™ pointing device interfaces.

Throughout the discussion herein of the present invention the term 'pointing device', 'mouse', 'trackball', 'Thinkpoint™', 'ScrollPoint™', or the like should be interpreted in its broadest sense to indicate any method of acquiring user input. While this term specifically anticipates mouse (FIG. 3 and variants), trackball, thumbwheel, scrolling wheel (FIG. 4 and variants), touchpad (FIG. 5, (0500) and variants), Trackpoint™ (FIG. 5, (0531) and variants), and Scrollpoint™ (FIG. 6 and variants) input mechanisms, it should not be limited to these forms of input devices.

Translation Means Not Limitive

Figure 9:
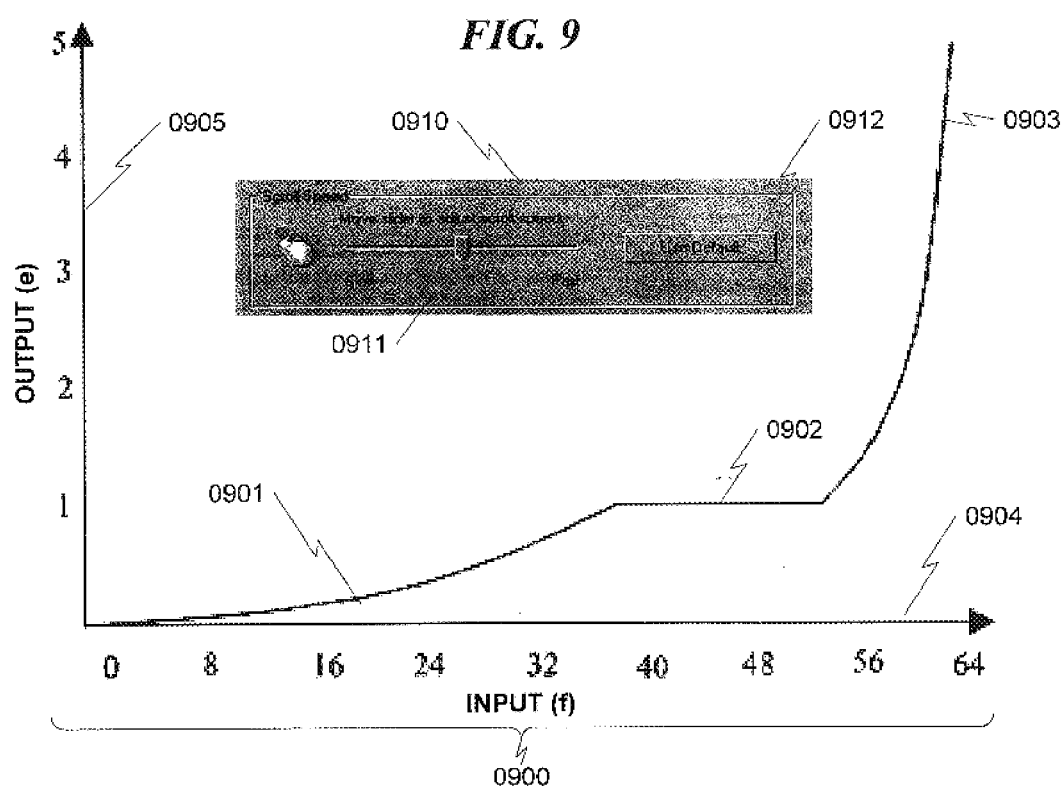
FIG. 9 illustrates an exemplary scroll speed/acceleration curve and control panel input dialog box that may be used to advantage with the present invention.

Throughout the discussion herein of the present invention the 'translation function', 'curve', 'function' or the like should be interpreted in its broadest sense to indicate any method of modifying the raw scrolling input messages that are obtained from the pointing device. Thus, while the translation function illustrated in FIG. 9 is exemplary of one preferred embodiment, one skilled in the art will recognize that this functionality may be provide in a wide variety of other means, including but not limited to lookup tables, closed form functions, and the like.

Overview

Figure 8:
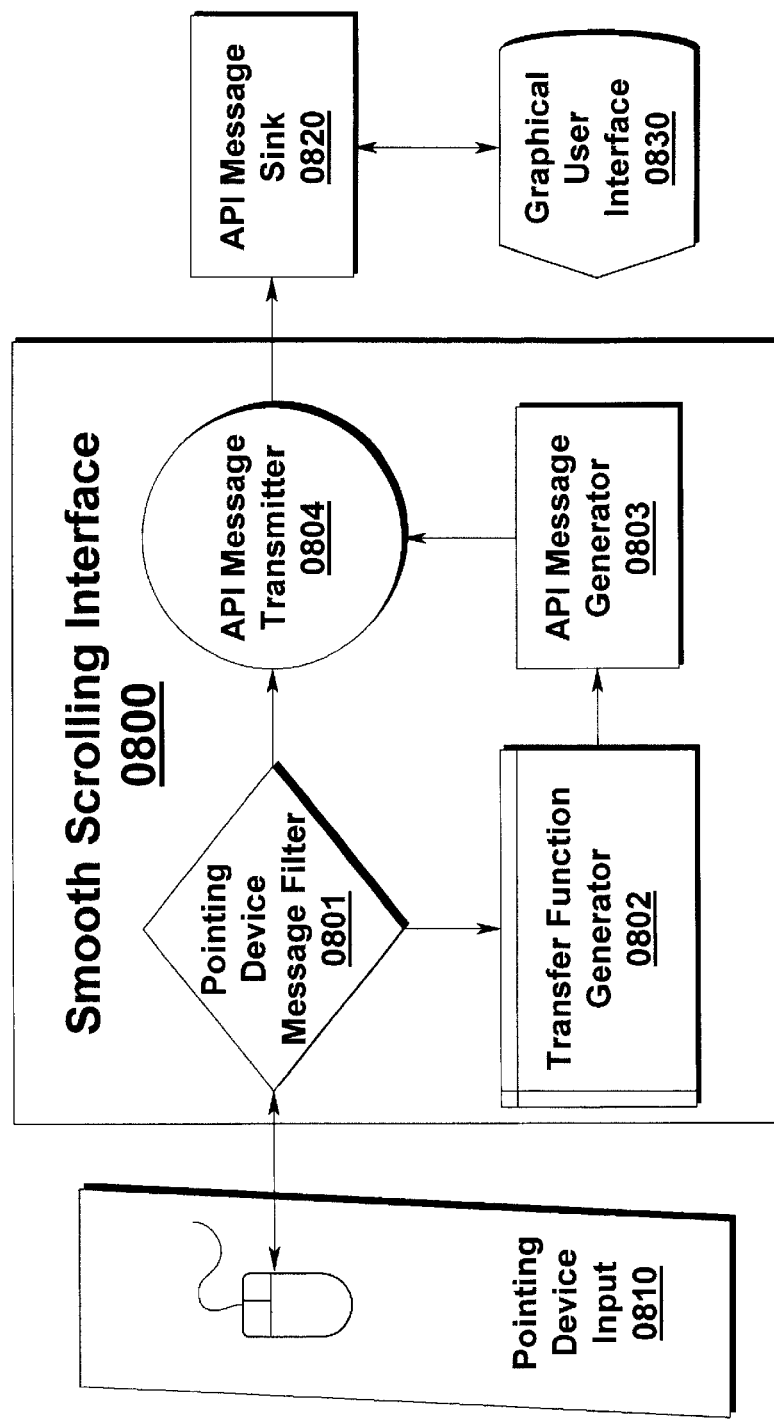
FIG. 8 illustrates an exemplary generalized system block diagram of the present invention system architecture.

The present invention generally can be viewed in terms of the exemplary system architecture (0800) illustrated in FIG. 8. This exemplary architecture comprises the following components: provides the following features:

1. A Pointing Device Message Filter (0801) to decode state and/or input information from the Pointing Device Input (0810) and/or other pointing device context information to determine if this information constitutes a smooth scrolling command or some other command.
2. A Transfer Function Generator (0802) to scale and otherwise transform the pointing device input into a suitable value for smooth scrolling requests.
3. An API Message Generator (0803) to take the scaled value from the Transfer Function Generator (0802) and generate appropriate smooth scrolling commands.
4. An API Message Transmitter (0804), or some other means for transmitting the messages from the API Message Generator (0803) to the API Message Sink (0820) that eventually are processed by some user application to a Graphical Interface (0830).

Those skilled in the art will recognize that the Pointing Device (0810), API Message Sink (0820), and Graphical User Interface (0830) are not mandatory components of the present invention architecture (0800). The features illustrated in FIG. 8 may generally be accomplished by the exemplary system architecture that will now be discussed in detail.

Pointing Device Message Filter (0801)

Referring to FIG. 8, the purpose of the Pointing Device Message Filter (0801) is to intercept information from the Pointing Device Input (0810) that corresponds to state information that should activate the smooth scrolling function. There are a variety of methods to perform this function.

Figure 6:
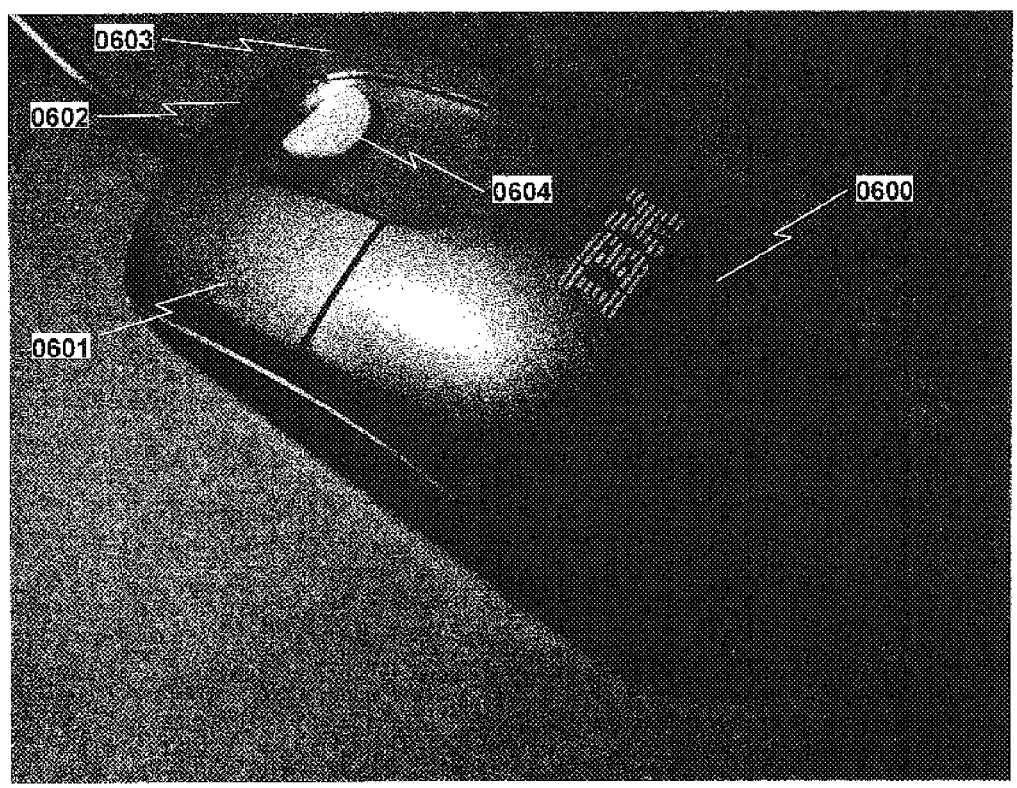
FIG. 6 illustrates an exemplary input device that may be used to advantage with the present invention.

For example, using the pointing device illustrated in FIG. 6, the dedicated Scrollpoint™ input (0604) may be used to provide the information that should be directly mapped to a smooth scrolling request to the API Message Sink (0820). A wide variety of pointing device hardware styles discussed previously have additional inputs in the form of scrolling wheels (0402), touch pads (0500), ThinkPoint™ style inputs, and/or Scrollpoint™ inputs (0604) that may provide this functionality. As mentioned previously, an existing hardware input device may be augmented with a context associated with the use of a keyboard button in addition to the pointing device input to provide this additional information. An example already mentioned in this respect is the use of the touch pad scroll regions (0521, 0523) for this purpose.

Figure 10:
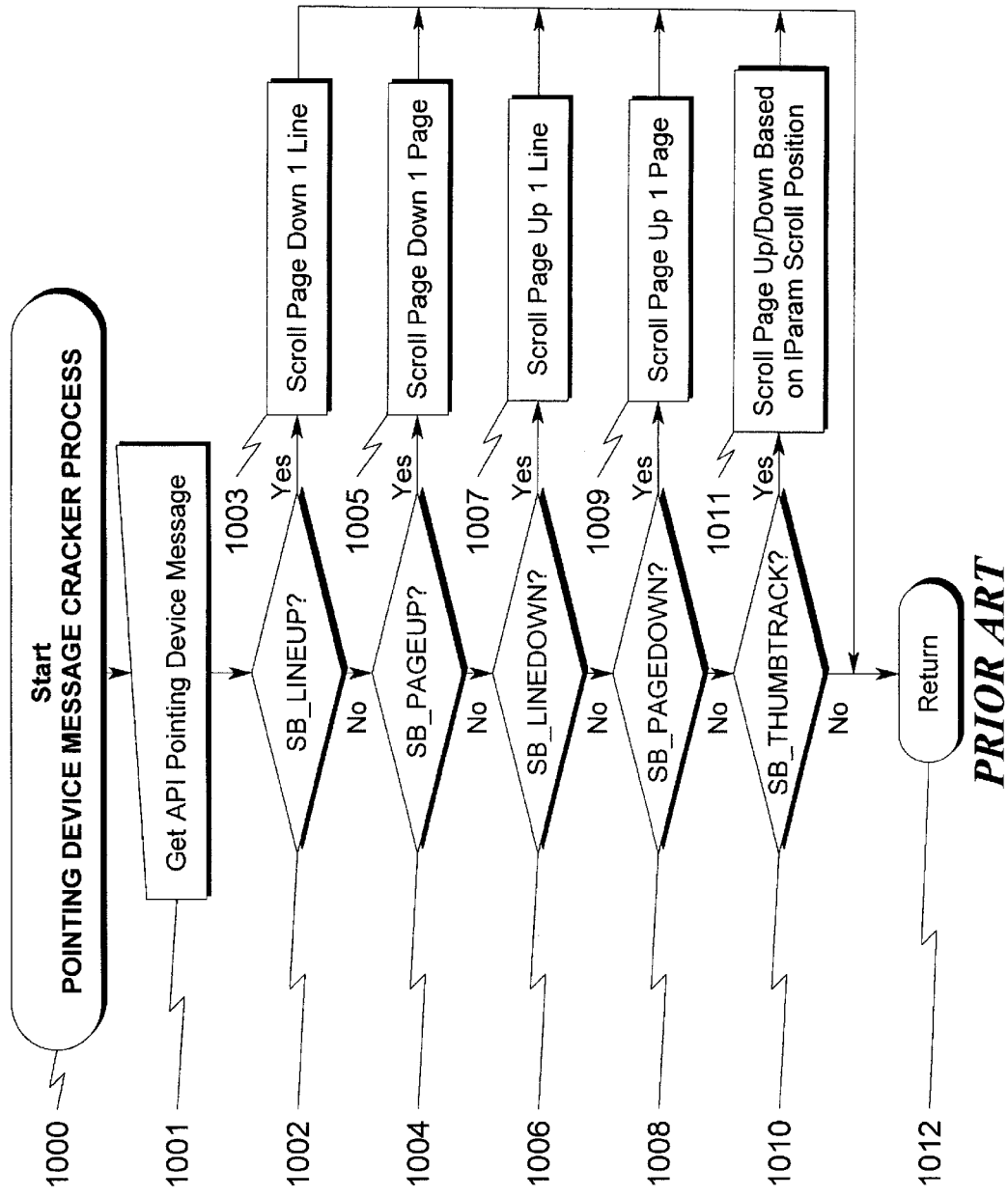
FIG. 10 illustrates a prior art flowchart of a conventional mouse message cracker process that is typically utilized in API message sinking applications.

As illustrated in FIG. 8, pointing device information that is not targeted for smooth scrolling requests is generally passed on unmodified via the API Message Transmitter (0804) to the API Message Sink for later use by the Graphical User Interface (0830) conventional message cracker (FIG. 10).

Transfer Function Generator (0802)
Overview

Once the Pointing Device Input (0810) has been determined to be associated with a smooth scrolling request, this information (typically constituting a desired smooth scrolling increment (f)) is passed to a Transfer Function Generator (0802) whose responsibility is to scale the smooth scrolling request to permit the document and/or window to be ergonomically scrolled for the user.

While one skilled in the art will recognize that a plethora of transfer function generators may be applicable to any given embodiment of the present invention, nonetheless a preferred embodiment will be detailed to illustrate the general teachings of the present invention.

Exemplary Transfer Function (0910)

Referencing FIG. 9, an exemplary transfer function generator $$e=\text{curve}(f) \quad (1)$$

having the domain (0904) and range (0905) as illustrated in the graph (0900) will now be described in detail.

The basic scroll speed/acceleration transfer function (0900) as illustrated in FIG. 9 has three transfer function segments that will now be discussed separately.

In the first segment (0901), the output increases proportionally to the input, in an accelerated non-linear fashion. For example, the relationship can be a power function $$e=K\times f^P \quad (2)$$

where
$1 \leq P \leq 3$
K=constant

The output value in this segment corresponds to low scrolling speed, and typically ranges from 0 to around 20 lines per second in many preferred embodiments.

In the second segment of the transfer function (0902), the output remains at the same level as the input increases. The scrolling speed corresponding to this output value is around 20 lines per second in many preferred embodiments. It is a speed at which a user can comfortably track the visual features of a document (headings, figures, and paragraphs). This second segment of the transfer function makes scrolling more controllable. For a large range of input values, the output will be kept under a speed that is visually trackable. Instability factors due to the user's scrolling action or due to scrolling sensor's inconsistency will be inhibited. This feature is especially important in situations where there is a large variation in the functional output of the scrolling sensor caused by manufacturing variations, temperature, etc.

The third segment of the transfer function (0903), whose output is proportional to input in an accelerated fashion, enables a user to scroll a large document quickly by a large distance. The user has to deliberately exert large input to reach this high speed. This in some exemplary embodiments of the pointing device (0600) would correspond to a high level of finger pressure on the scrolling input (0604) for example.

Scrolling Sensitivity Adjustment (0910)

The overall sensitivity of scrolling may in many preferred embodiments be adjusted by the user through the use of a Microsoft® Windows™ Control Panel or equivalent user preference settings adjustment method (0910) as illustrated in FIG. 9. The effect of this adjustment (0911) is to compress or expand the transfer function (0900) illustrated in FIG. 9 along the horizontal axes. As with other control panel settings, many exemplary embodiments of the present invention will incorporate a method for initializing the scrolling transfer function to factory default settings (0912).

As an illustrative example, in many preferred embodiments the (f) value (0904) illustrated in FIG. 9 is multiplied by a sensitivity factor (K) (that typically ranges from 0.25 to 4). When (K) is greater then 1 the scrolling becomes more sensitive. When K is less than 1, the scrolling becomes less sensitive.

API Message Generator (0803)

Once the Transfer Function Generator (0802) has generated a proper scrolling increment (e) as exemplified by (0905), this information is then translated into suitable API messages (SB_LINEUP/SB_LINEDOWN/SB_PAGEUP/SB_PAGEDOWN/SB_THUMBSCROLL, etc.) by an API Message Generator (0803). While the exact nature of this translation is API and operating system specific, an exemplary embodiment of this functionality is illustrated in the code samples of FIGS. 12–16. One skilled in the art will no doubt be able to expound on the exemplary embodiment illustrated in FIGS. 12–16 and convert this to any number of other operating system and API environments.

API Message Transmitter (0804)

The function of the API Message Transmitter (0804) is to traffic API messages that are sourced from either the Pointing Device Input (0810) through the Pointing Device Message Filter (0801) or the API Message Generator (0803). The functionality in the API Message Transmitter (0804) is very simple and may be omitted in some embodiments. In general, there must be some way of transmitting API messages to the API Message Sink (0820) and/or the Graphical User Interface (0830), either of which may be integrated into a general user application program (0108, 0708).

API Message Sink (0820)

While the API Message Sink (0820) need not technically be a part of the present invention, an illustration of a typical API Message Sink (0820) as depicted in FIG. 10 as a pointing device message cracker process (1000) is instructive in understanding the operation of the present invention.

From FIG. 10 it is clearly seen that a conventional pointing device message cracker process (1000) implemented in an application program (0708, 0709) starts by getting the API pointing device message (1001). This message is then sequentially compared (typically using C-code SWITCH functions) to LINE UP (1002), PAGE UP (1004), LINE DOWN (1006), PAGE DOWN (1008), and/or THUMBTRACK (1010) messages. Matches of these messages generate corresponding scrolling of the document/ window down 1 line (1003), down 1 page (1005), up 1 line (1007), up 1 page (1009), or up/down based on a THUMB-TRACK message parameter (1011) respectively. Once the document/window has been updated, return controls to the remainder of the application and/or API interface.

The conventional message cracker process (1000) is a typical API Message Sink (0820) but by no means the only method of implementing the Message Sink functionality. What is important to recognize from the example in FIG. 10 is that the primitives generated by the API Message Generator (0803) should be capable of interpretation by the API Message Sink (0820). The primitives illustrated in FIG. 10 typically satisfy this requirement for most typical application programs, but may not do so for all application programs.

Figure 7:
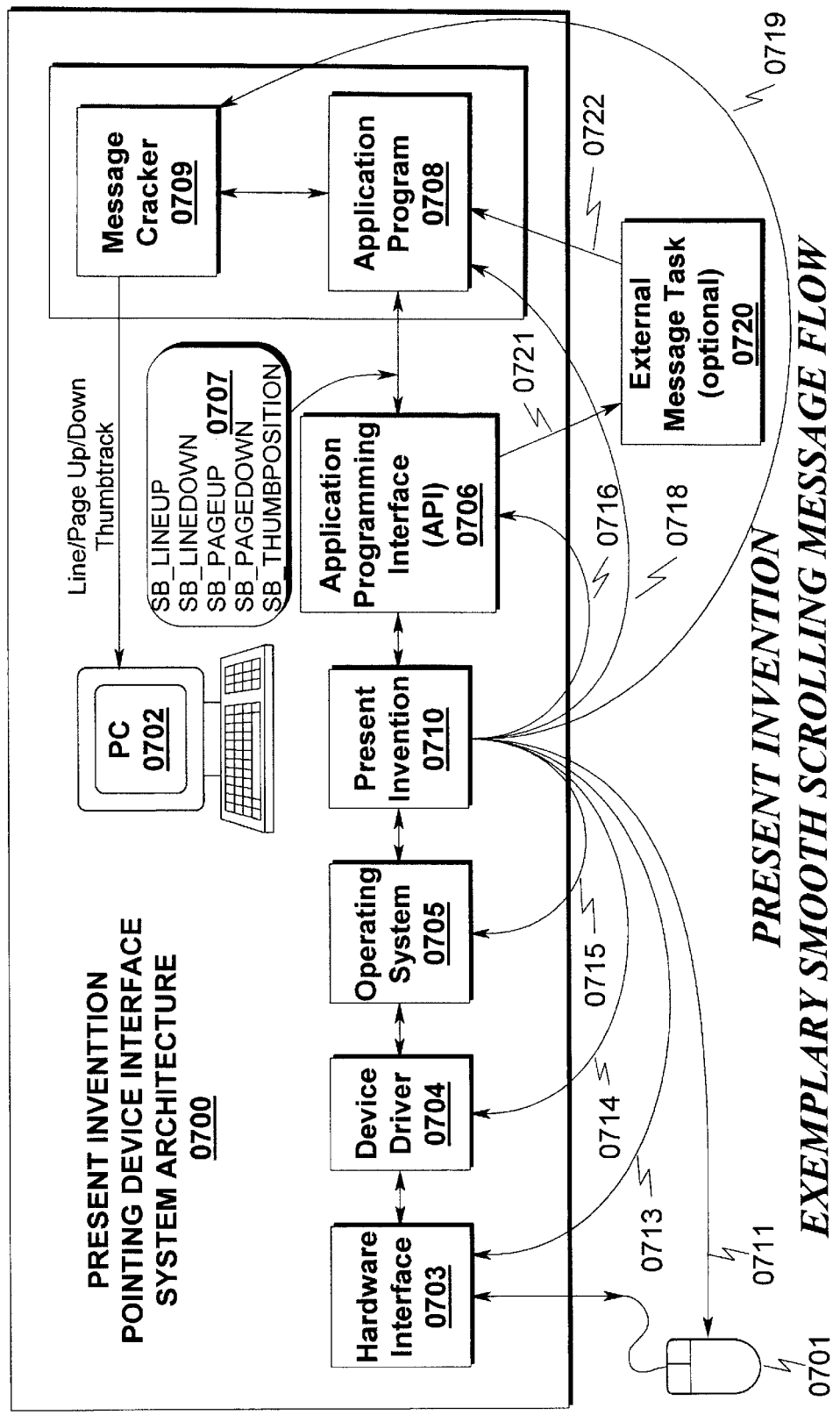
FIG. 7 illustrates an exemplary system block diagram of the present invention system architecture.

As mentioned previously, the functionality of the present invention as illustrated in FIGS. 7–8 can be implemented directly in the application API message sink (message cracker) of FIG. 10, but in many circumstances this is not convenient since this requires modification of each application program that the user activates. By embedding the present invention in other parts of the operating environment, this permits the desired smooth scrolling functionality to be implemented without any major application program changes.

Method

Exemplary Smooth Scrolling Method

Figure 11:
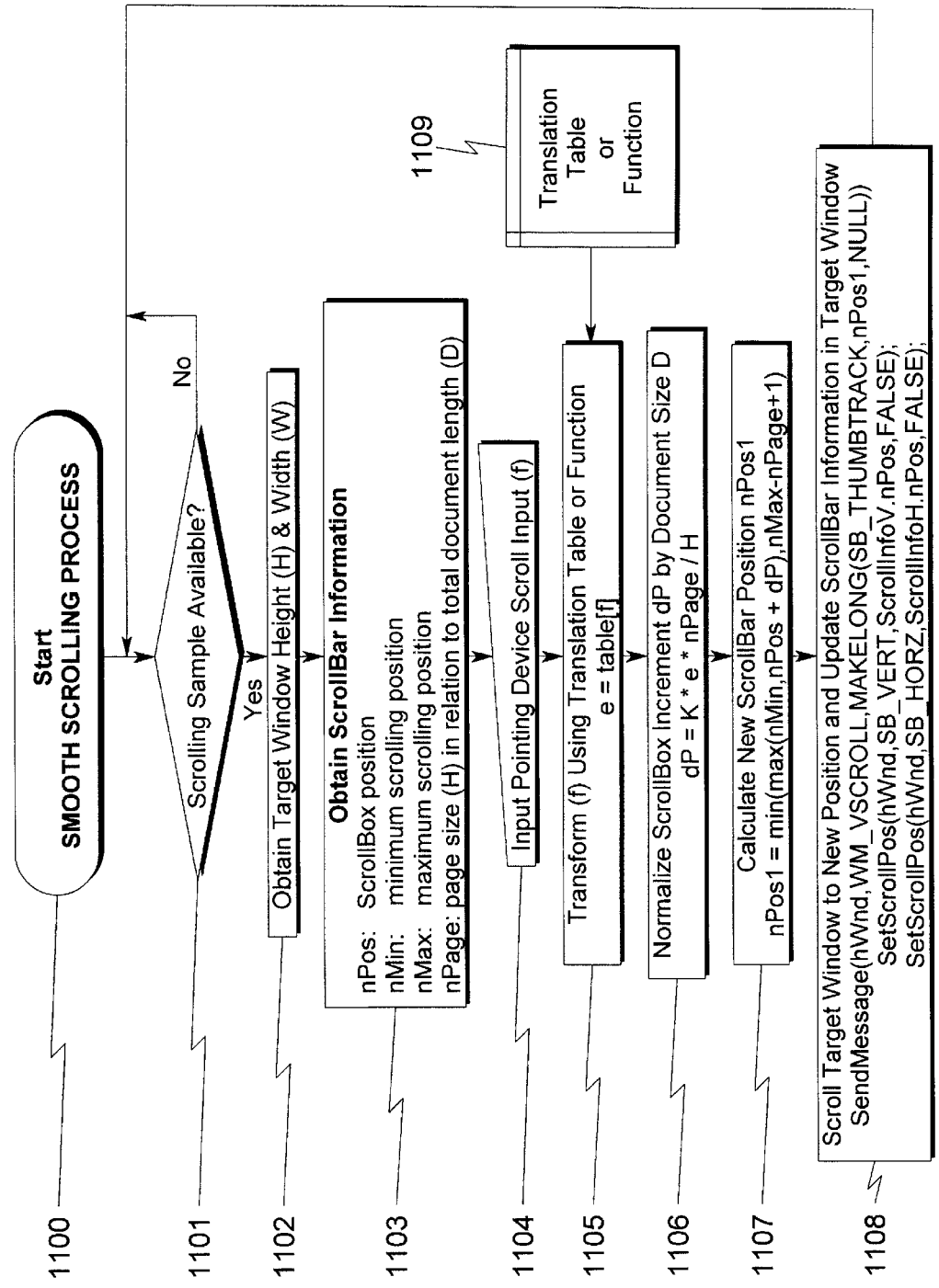
FIG. 11 illustrates an exemplary flowchart illustrating a preferred embodiment of the present invention smooth scrolling process.
Figure 12:
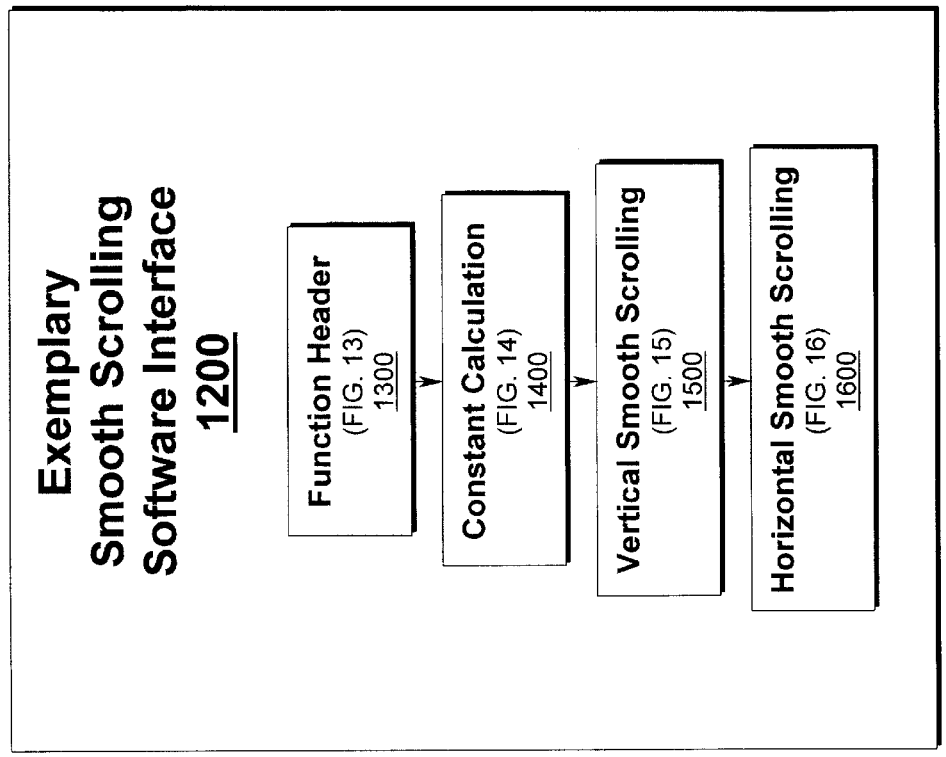

An exemplary general present invention method may best be understood by referencing the system diagrams of FIGS. 7–8 and the exemplary flowchart of FIG. 11. These diagrams will now be discussed in detail.

Referencing FIG. 11, the exemplary Smooth scrolling method (1100) involves the following steps:
1. Determining if a scrolling sample is available (1101), and if not, proceeding to step (1).
2. Obtaining the target window height (H) and/or width (W) (1102).
3. Obtaining scroll bar information (1103).
4. Obtaining the pointing device scrolling input value (1104).
5. Transforming the pointing device scrolling input value (1105) using a translation table and/or function (1109);
6. Normalizing the scroll box increment by the document size (1106).
7. Calculating a new scrollbar position (1107).
8. Scrolling the target window to the new scroll bar position, updating the scroll bar information in the target window (1108), and then proceeding to step 1.

One skilled in the art will recognize that these steps may be rearranged and/or augmented with no loss of generality in the teachings of the present invention.

The teachings of the present invention are sufficiently broad to not limit the manner in which the above mentioned steps are to be performed as well as not limiting the method to any particular hardware, operating system, API, or graphical user interface. Thus, while the particular information gathered within the context of FIG. 11 and the specific function calls listed in the exemplary flowchart are preferred for some embodiments, they are by no means Limitive of the present invention teachings or the scope thereof.

Generalized Methodology

The general teaching of the present invention that is fundamental to all embodiment is the fact that the Transfer Function Generator (0802) and/or the translation table/ function step (1105) operate in conjunction with a normalization operation to increment the scrolling increment dP (delta page) (1107) based on the document size D. Thus, for a large document, smooth scrolling would dictate a small page movement (0901) in response to scrolling input (unless the user had a large scrolling input as in region (0903) of FIG. 9). This is in contrast to the prior art, which defines the dP (delta page) increment in terms of the defined scroll box size and not the document size in relation to the page size (H).

It should be noted that one skilled in the art would be able to take the functional relationship between the scrolling increment (dP) as illustrated in step (1106) and produce a plethora of similar variants given the teachings of the present invention. The present invention anticipates this modification, as well as a plethora of other translation function curves as exemplified by FIG. 9.

Computer Software

As would be known by one skilled in the art and as indicated in the exemplary embodiment of FIGS. 12–16, the system and method described herein and generally illustrated in FIGS. 1–11 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft® Windows™ operating environment in all its variations or its equivalent commercial embodiments, including but not limited to any system incorporating a graphical user interface.

CONCLUSION

A device and application independent smooth scrolling system and method have been disclosed wherein the scrolling increment is normalized according to the document size, thus permitting a more ergonomic, consistent and more user-friendly scrolling technique in which to view documents and the like. In contrast to the prior art, the present invention is amenable to use with a wide variety of both linear and non-linear scroll input hardware, and provides an optional method of compensating for the characteristics of these differing hardware devices.

Of significance in the realm of practical considerations is the fact that the present invention can be either incorporated into a variety of pointing device software and/or hardware components, or can be transparently implemented as an optional ancillary task that monitors pointing device messages prior to their transmission to the application program. In any of these situations, the present invention can implement smooth scrolling functionality without the need for modifications of the application program, a significant benefit in retrofit applications where the message cracker of the application program cannot be accessed or modified.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A method on an information processing system for smooth scrolling, comprising:
   obtaining a height and/or width of a window;
   obtaining metadata of a scroll bar in the window, wherein the metadata includes a current scroll bar position;
   receiving from a pointing device a scrolling signal associated with the window, wherein the scrolling signal includes input values of a scrolling indicator and a sensitivity factor;
   transforming the input values;
   normalizing a scroll box increment of the window according to a size of a document in the window;
   calculating a new scroll bar position based on the metadata of the scroll bar and the input values; and
   scrolling the window to the new scroll bar position.

2. The method of claim 1, wherein the pointing device is a mouse.

3. The method of claim 1, wherein the transforming the input comprises:
   transforming the input values using a translation table.

4. The method of claim 1, wherein the transforming the input comprises:
   transforming the input values using a transfer function.

5. The method of claim 4, wherein the transfer function includes three segments, wherein in the first segment output values are proportional to output values, in the second segment output values remain the same as output values increase, and in the third segment output values are proportional to output values.

6. The method of claim 1, wherein the normalizing a scroll box further includes:
   modifying a scroll box increment of the window according to a size of a document in the window, such that scrolling of the window results in uniform page movements regardless of a size of a document in the window.

7. The method of claim 1, wherein the window is scrolled to the new scroll bar position at a rate of zero to twenty lines per second.

8. A computer readable medium on an information processing system including computer instructions for smooth scrolling, the computer instructions including instructions for:
   obtaining a height and/or width of a window;
   obtaining metadata of a scroll bar in the window, wherein the metadata includes a current scroll bar position;
   receiving from a pointing device a scrolling signal associated with the window, wherein the scrolling signal includes input values of a scrolling indicator and a sensitivity factor;
   transforming the input values;
   normalizing a scroll box increment of the window according to a size of a document in the window;
   calculating a new scroll bar position based on the metadata of the scroll bar and the input values; and
   scrolling the window to the new scroll bar position.

9. The computer readable medium of claim 8, wherein the pointing device is a mouse.

10. The computer readable medium of claim 8, wherein the instructions for transforming comprise:
    transforming the input values using a translation table.

11. The computer readable medium of claim 8, wherein the instructions for transforming comprise:
    transforming the input values using a transfer function.

12. The computer readable medium of claim 11, wherein the transfer function includes three segments, wherein in the first segment output values are proportional to output values, in the second segment output values remain the same as output values increase, and in the third segment output values are proportional to output values.

13. The computer readable medium of claim 8, wherein the instructions for normalizing comprise:
    normalizing a scroll box increment of the window according to a size of a document in the window, such that scrolling of the window results in uniform page movements regardless of a size of a document in the window.

14. The computer readable medium of claim 8, wherein the window is scrolled to the new scroll bar position at a rate of zero to twenty lines per second.

15. An information processing system for smooth scrolling, comprising:
    a message filter module for receiving from a pointing device a scrolling signal associated with the window, wherein the scrolling signal includes input values of a scrolling indicator and a sensitivity factor;
    a transfer function module for transforming the input values;
    an API message generator for generating an API scroll message based on the input values that were transformed;
    an API message transmitter for transmitting the API scroll message to an application API; and
    an application for:
        obtaining a height and/or width of the window;
        obtaining metadata of a scroll bar in the window, wherein the metadata includes a current scroll bar position;
        normalizing a scroll box increment of the window according to a size of a document in the window;
        calculating a new scroll bar position based on the metadata of the scroll bar and the input values; and
        scrolling the window to the new scroll bar position.

16. The information processing system of claim 15, wherein the pointing device is a mouse.

17. The information processing system of claim 15, wherein the transforming the input comprises:
    transforming the input values using a translation table.

18. The information processing system of claim 15, wherein the transforming the input includes comprises:
    transforming the input values using a transfer function.

19. The information processing system of claim 18, wherein the transfer function includes three segments, wherein in the first segment output values are proportional to output values, in the second segment output values remain the same as output values increase, and in the third segment output values are proportional to output values.

20. The information processing system of claim 15, wherein the normalizing the input comprises:
    modifying a scroll box increment of the window according to a size of a document in the window, such that scrolling of the window results in uniform page movements regardless of a size of a document in the window.

21. The information processing system of claim 15, wherein the window is scrolled to the new scroll bar position at a rate of zero to twenty lines per second.

* * * * *